US009272199B2

(12) United States Patent
Richter et al.

(10) Patent No.: US 9,272,199 B2
(45) Date of Patent: Mar. 1, 2016

(54) SYSTEM, METHOD AND APPARATUS FOR CAPTURING AND TRAINING A SWING MOVEMENT OF A CLUB

(71) Applicant: Applejack 199 L.P., San Jose, CA (US)

(72) Inventors: Uwe Richter, San Jose, CA (US); Xiping Huo, San Jose, CA (US); Ann Koo, San Jose, CA (US); Nikolai Maltsev, San Jose, CA (US); Louis Lau, San Jose, CA (US); John Groot, San Jose, CA (US)

(73) Assignee: Applejack 199 L.P., San Jose, CA (US)

( * ) Notice: Subject to any disclaimer, the term of this patent is extended or adjusted under 35 U.S.C. 154(b) by 256 days.

(21) Appl. No.: 13/842,762

(22) Filed: Mar. 15, 2013

(65) Prior Publication Data

US 2014/0179455 A1   Jun. 26, 2014

(51) Int. Cl.
| | |
|---|---|
| *A63F 9/24* | (2006.01) |
| *A63B 69/36* | (2006.01) |
| *G01P 15/00* | (2006.01) |
| *G01P 15/18* | (2013.01) |
| *A63F 13/40* | (2014.01) |
| *A63B 24/00* | (2006.01) |
| *A63B 53/10* | (2015.01) |

(52) U.S. Cl.
CPC ............. *A63B 69/36* (2013.01); *A63B 24/0006* (2013.01); *A63B 69/3632* (2013.01); *A63F 13/10* (2013.01); *G01P 15/00* (2013.01); *G01P 15/18* (2013.01); *A63B 24/0003* (2013.01); *A63B 53/10* (2013.01); *A63B 2024/0009* (2013.01); *A63B 2024/0012* (2013.01); *A63B 2024/0015* (2013.01); *A63B 2220/24* (2013.01); *A63B 2220/34* (2013.01); *A63B 2220/40* (2013.01); *A63B 2220/44* (2013.01); *A63B 2220/62* (2013.01); *A63B 2220/806* (2013.01); *A63B 2225/20* (2013.01); *A63B 2225/50* (2013.01); *A63F 2300/1012* (2013.01)

(58) Field of Classification Search
USPC .................................................. 463/9, 31–42
See application file for complete search history.

(56) References Cited

U.S. PATENT DOCUMENTS

| | | | |
|---|---|---|---|
| 5,233,544 A | 8/1993 | Kobayashi | |
| 5,779,545 A | 7/1998 | Berg et al. | |
| 8,032,324 B1 * | 10/2011 | Bryant et al. | 702/141 |
| 8,597,142 B2 * | 12/2013 | Mayles et al. | 473/407 |
| 8,905,856 B2 * | 12/2014 | Parke et al. | 473/223 |
| 2003/0207718 A1 | 11/2003 | Perlmutter | |
| 2005/0215340 A1 * | 9/2005 | Stites et al. | 473/233 |
| 2006/0029916 A1 * | 2/2006 | Boscha | 434/252 |

(Continued)

FOREIGN PATENT DOCUMENTS

WO   2007/096069 A2   8/2007

OTHER PUBLICATIONS

SwingByte Web Archive dated Apr. 2012. Multiple documents.*

(Continued)

*Primary Examiner* — Masud Ahmed
(74) *Attorney, Agent, or Firm* — Burbage Law

(57) ABSTRACT

A system, method and apparatus for training a swing movement of a club includes storing a desired swing data in a measuring device, capturing a training swing data in the measuring device, comparing the training swing data to the desired swing data to determine a set of differential data, outputting a signal to a user corresponding to the set of differential data.

14 Claims, 8 Drawing Sheets

(56) References Cited

U.S. PATENT DOCUMENTS

| | | |
|---|---|---|
| 2006/0166737 A1* | 7/2006 | Bentley .................. 463/30 |
| 2006/0241392 A1 | 10/2006 | Feinstein et al. |
| 2007/0206837 A1 | 9/2007 | Kirby |
| 2007/0298896 A1* | 12/2007 | Nusbaum et al. ........... 473/131 |
| 2009/0031240 A1 | 1/2009 | Hildreth |
| 2009/0111582 A1 | 4/2009 | Schuler et al. |
| 2009/0273559 A1 | 11/2009 | Rofougaran et al. |
| 2009/0303204 A1* | 12/2009 | Nasiri et al. ............. 345/184 |
| 2010/0210371 A1 | 8/2010 | Sato et al. |
| 2011/0053698 A1 | 3/2011 | Stites et al. |
| 2011/0244952 A1 | 10/2011 | Schueller et al. |
| 2013/0130834 A1* | 5/2013 | Stites et al. ............. 473/346 |
| 2014/0135139 A1* | 5/2014 | Shibuya et al. ............ 473/207 |

OTHER PUBLICATIONS

International Search Report dated Apr. 23, 2014 as received in Application No. PCT/IB2013/061229.
Written Opinion of the International Searching Authority dated Apr. 23, 2014 as received in Application No. PCT/IB2013/061229.
International Search Report dated Jul. 2, 2015 as received in Application No. PCT/US2015/024056.
Written Opinion of the International Searching Authority dated Jul. 2, 2015 as received in Application No. PCT/US2015/024056.

* cited by examiner

SYSTEM, METHOD AND APPARATUS FOR CAPTURING AND TRAINING A SWING MOVEMENT OF A CLUB

CROSS REFERENCE TO RELATED APPLICATIONS

This application claims priority from and is a continuation in part of German Patent Application 10 2012 224 321.6 filed on Dec. 21, 2012 and entitled "Messvorrichtung zum Erfasses einer Schlagbewegung eines Schlägers, Trainingsvorrichtung and Verfahren zum Training einer Schlagbewegung," which is incorporated herein by reference in its entirety and for all purposes.

BACKGROUND

The invention relates to a system, method and apparatus for measuring a swing, providing analysis of the swing and providing feedback to a user.

Prior art swing measuring devices do not provide sufficient precision and appropriate and timely feedback to the user.

SUMMARY

Broadly speaking, the present invention fills these needs by providing a system, method and apparatus for measuring a swing, providing analysis of the swing and providing feedback to a user. It should be appreciated that the present invention can be implemented in numerous ways, including as a process, an apparatus, a system, computer readable media, or a device. Several inventive embodiments of the present invention are described below.

One embodiment provides a method for training a swing movement of a club including storing a desired swing data in a measuring device, capturing a training swing data in the measuring device, comparing the training swing data to the desired swing data to determine a set of differential data, outputting a signal to a user corresponding to the set of differential data.

Another embodiment provides a measuring device to capture a swing movement of a club. The measuring device includes a first three dimensional accelerometer to capture a first two-dimensional vector of acceleration within a first range of acceleration, a second three dimensional accelerometer to capture a second two-dimensional vector of acceleration within a second range of acceleration different from the first range of acceleration, and a first angle sensor to capture of a first rotation angle, a second rotation angle and a third rotation angle, the first rotation angle corresponding to the first two-dimensional vector of acceleration around a z-axis, where the z-axis is substantially normal to the two-dimensional vector of acceleration, the second angle of rotation corresponding to a one-dimensional acceleration vector to a y-axis, the y-axis is essentially perpendicular to the one-dimensional acceleration vector.

Yet another embodiment provides a measuring device to capture a swing movement of a club including at least a two dimensional accelerometer to capture a two-dimensional vector of acceleration, at least a single-dimensional accelerometer to capture a one-dimensional acceleration vector, where at least a one-dimensional accelerometer is arranged to at least a two dimensional accelerometer, that the captured one-dimensional acceleration vector is essentially orthogonal to a two-dimensional acceleration vector captured by at least one two-dimensional acceleration sensor, and a first angle of rotation sensor for the capture of the first rotation angle of the two-dimensional vector of acceleration around a z-axis, where the first angle of rotation sensor is arranged to at least one two-dimensional accelerometer, so that the z-axis is substantially normal to the two-dimensional vector of acceleration, marked by a second angle of rotation sensor to collect a second angle of rotation of the one-dimensional acceleration vector to a y-axis, where the second angle of rotation sensor is arranged to at least one one-dimensional accelerometer, so that the y-axis is essentially perpendicular to the one-dimensional acceleration vector.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for a system, method and apparatus for measuring a swing, providing analysis of the swing and providing feedback to a user will now be described. It will be apparent to those skilled in the art that the present invention may be practiced without some or all of the specific details set forth herein.

Figure 1A:
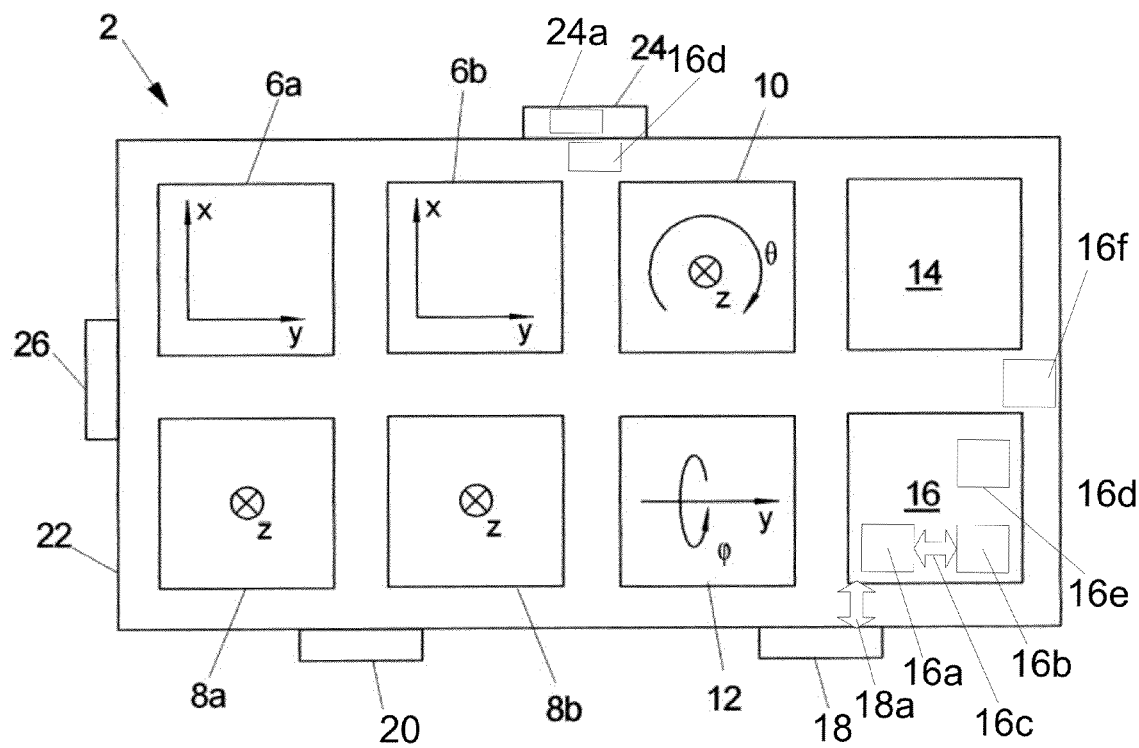
FIG. 1A is a schematic of a measuring device to capture a swing movement of a club, in accordance with embodiments of the present invention.

FIG. 1A is a schematic of a measuring device 2 for capturing a swing movement of a club, in accordance with embodiments of the present invention. The measuring device 2 measures movement of a club 4, which hits a ball, hereafter referred to as swing movements. A swing movement is divided into the sections swing beginning of the swing (a) with a backswing (b), then a forward swing (c), followed by an impact (d) with the ball. The measuring device 2 measures the swing movement as a function of time, so that the relevant interval between the beginning of the swing (a) and impact (d) can be evaluated.

The measuring device 2 is suited, for example, for the measurement of swing movements in golf, baseball, tennis and hockey. The measuring device 2 can measure the swing movement of a golf club 4 as shown in more detail in FIGS. 2 and 3.

The measuring device 2 includes two, two-dimensional accelerometers 6a, 6b to capture a two-dimensional vector of acceleration $\bar{a}_{xy}$. The measuring device 2 also includes two, one-dimensional accelerometers 8a, 8b to capture a one-dimensional acceleration vector $\bar{a}_2$. The one-dimensional accelerometers 8a, 8b are arranged relative to the two-dimensional accelerometers 6a, 6b such that the one-dimensional acceleration vector $\bar{a}_2$ is substantially orthogonal to the two-dimensional acceleration vector $\bar{a}_{xy}$.

The measuring device 2 also includes a first angle sensor 10 to capture a first rotation angle $\theta$. The first angle sensor 10 is coupled to the two-dimensional accelerometers 6a, 6b such that the first rotation angle $\theta$ the rotation angle of the two-dimensional vector of acceleration $\bar{a}_{xy}$ around corresponds to an axis z, that is substantially orthogonal to the two-dimensional vector of acceleration $\bar{a}_{xy}$.

The measuring device 2 also includes a second angle sensor 12 to capture a second angle of rotation $\phi$. The second angle sensor 12 is coupled to the one-dimensional accelerometers 8a and 8b such that the second angle $\phi$ relates to the rotation angle of the one-dimensional acceleration vector $\bar{a}_2$ around a Y-axis that is substantially perpendicular to the one-dimensional acceleration vector $\bar{a}_2$. The second angle of the rotation $\phi$ is the angle of rotation in the plane of the swing.

The two-dimensional accelerometers 6a, 6b can function in two different, partially overlapping measurement ranges. The measurement of the two-dimensional accelerometer 6a ranges between about 5 g to about 250 g and is thus particularly suited to relatively faster swings. The other two-dimensional acceleration sensor 6b ranges between about 0 g to about 15 g and is thus particularly suited for relatively slow swings.

Each one of the two-dimensional accelerometers 6a, 6b can include two, one-dimensional accelerometers. These one-dimensional accelerometers of the two dimensional accelerometer 6a, 6b can have substantially identical regarding the measuring range. Alternatively, these one-dimensional accelerometers of the two dimensional accelerometer 6a, 6b can have substantially different measurement ranges for these one-dimensional acceleration sensors. The one-dimensional accelerometers of the two dimensional accelerometer 6a can be substantially identical to the one-dimensional accelerometer 8a. The one-dimensional accelerometers of the two-dimensional accelerometer 6b can be substantially identical with the one-dimensional accelerometer 8b. Alternatively the one-dimensional accelerometers of the two-dimensional accelerometers 6a, 6b can be different than the one-dimensional accelerometers 8a, 8b. The two-dimensional accelerometers 6a, 6b can be housed in a single component.

The angle sensors 10, 12 provide means for detecting an angular velocity. The angle sensors 10, 12 can be gyroscopic sensors. The angle sensors 10, 12 can be orthogonal to each other, to measure the rotation angles $\theta$ and $\phi$. The angle sensors 10, 12 work in a range from about 50 to about 2000 degrees per second (deg/s).

The accelerometers 6a, 6b, 8a, 8b, and the angle sensors 10, 12 can be micro electro-mechanical systems, commonly known as MEMS.

The measuring device 2 also includes a timing means 14. The timing means 14 measures the timing parallel to the accelerometers 6a, 6b, 8a, 8b, and the angle sensors 10, 12 allowing each measured value of the accelerometers 6a, 6b, 8a, 8b, and of the angle sensors 10, 12 to have a corresponding time value assigned.

The measuring device 2 also includes a computation means 16. The computation means 16 receives and preprocess the raw data that are provided by the accelerometers 6a, 6b, 8a, 8b, the angle sensors 10, 12 and the timing means 14. The computation means 16 calculates a time dependent position of the club in space, as well as the club orientation and speed in the course of the swing based on the captured raw data and on the basis of physical models. The computation means 16 can also, optionally, scale the processed data to correspond to a scale of a desired swing. The processed, optionally scaled, data can be compared with a set of reference data corresponding to a desired swing by the computation means 16. A detailed description of the function of the computation means 16 is given below in connection with the description of a method for training a user to use a desired swing using the measuring device 2.

The computation means 16 includes a memory system 16a, a processor 16b and a bus 16c coupling the memory system to the processor. The memory system 16a stores programs that serve the evaluation of raw data received from the accelerometers of 6a, 6b, 8a, 8b, the angle sensors 10, 12 and the timing means 14. The memory can also store a variety of sets of reference data such as may meet an ideal swing sequences that can be used to compare with measured swing movements.

The computation means 16 is coupled to an interface 18. Thus, the raw data, from the angle sensors 10, 12, the accelerometers 6a, 6b, 8a, 8b and timing means 14, and/or the data evaluated by the computation means 16 can be output such as, to one or more external data processing systems. Alternatively, the interface 18 can also provide access to update and/or to replace the programs or reference data. The interface 18 can be a USB connection, a Bluetooth interface, an infrared port or another common wireless or wired interface. Preferably, the interface provides a Bluetooth interface for a connection to typical smartphone to allow the smartphone to be used as an external data processing system.

The measuring device 2 can also include a control panel 20. The control panel 20 provides a user access to can select software and otherwise provide user input to the computation means 16. The control panel 20 also provides access for a user to select a reference data set that may be compared to a measured swing movement.

The accelerometers 6a, 6b, 8a, 8b, the angle sensors 10, 12, the timing means 14 and the computation means 16 can be disposed within a compact housing 22. The housing 22 also include one or more fasteners 24 for removably mounting the measuring device 2 to a club 4.

The measuring device 2 can also include a signaling device 26. The signaling device 26 can be attached to the exterior of the housing 22. Alternatively, the signaling device 26 can be disposed within in the housing 22. The signaling device 26 emits acoustic and/or optical signals to a user. The emitted signal can also include a vibration signal. The signaling device 26 can emit signals when the difference between the values calculated by the computational means 16 and a selected set of reference data exceeds a limit. The limit can be set by the user.

The measuring device 2 can also include a motion sensing power switch 16d, shown in FIG. 1A. The motion sensing power switch 16d applies power to the measuring device 2 when motion is detected such as a practice swing of the club 4.

The measuring device 2 can also include a mount sensor 24a that detects when the measuring device 2 is mounted to the club by fasteners 24. The mount sensor 24a can enable the motion sensing power switch 16d to begin sensing for motion. Alternatively, the mount sensor 24a can apply power to the measuring device 2. The mount sensor 24a can be a pressure sensing switch capable of sensing the presence of the club by pressure. The mount sensor 24a can be a magnetic switch capable of magnetically detecting the club. The mount sensor 24a can be an optical detector capable of optically detecting the presence of the club 4 or a particular tag or color on the club 4. The mount sensor 24a can be any other suitable switching device.

Figure 1B:
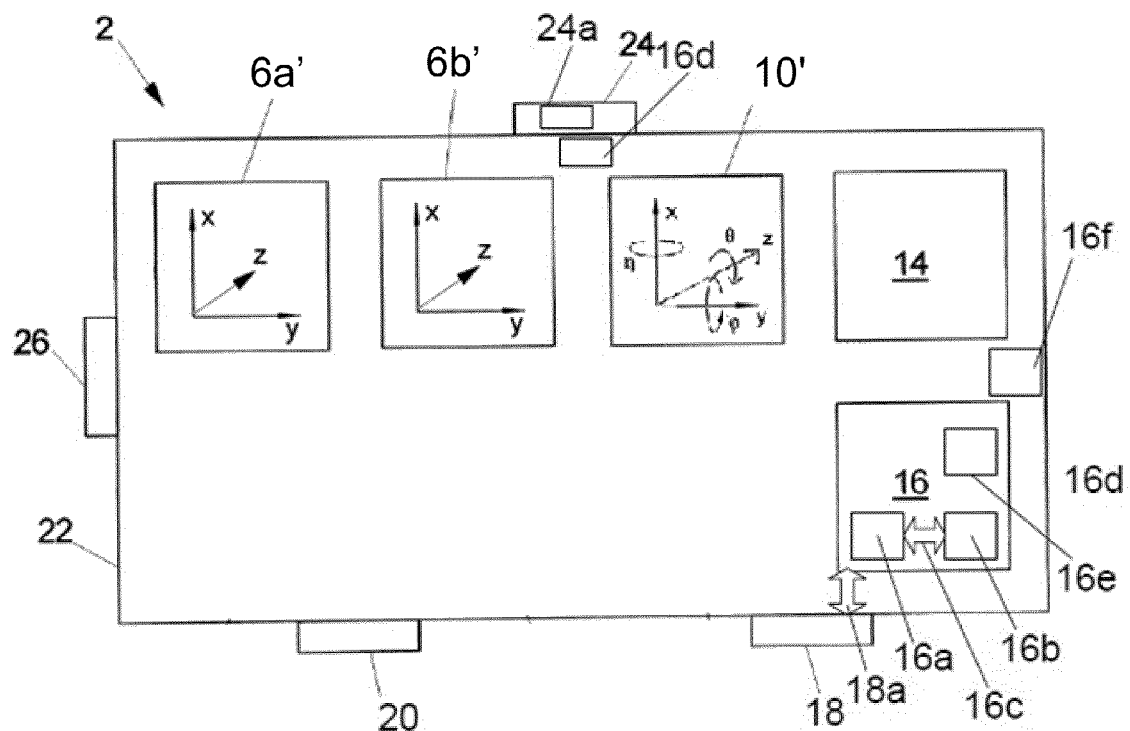
FIG. 1B is a schematic of an alternative measuring device for capturing a swing movement of a club, in accordance with embodiments of the present invention.

FIG. 1B is a schematic of an alternative measuring device 2' for capturing a swing movement of a club, in accordance with embodiments of the present invention. The alternative measuring device 2' is substantially similar to the measuring device 2 except for some combining some functions of the accelerometers and angle sensors into two, three-dimensional accelerometers 6a', 6b' to capture a three-dimensional vector of acceleration $\bar{a}_{xyz}$. Multiple accelerometers provide improved the accuracy such as by measuring an amplified signal in parallel and also allowing an adjustment in the orientation that can be used to optimize sensitivity of the accelerometer's output data.

The measuring device 2' also includes a single angle sensor 10' to capture a first rotation angle θ, a second rotation angle φ and the third rotation angle η. The angle sensor 10' is coupled to the three-dimensional accelerometers 6a', 6b' such that the first rotation angle θ is the rotation angle of the two-dimensional vector of acceleration $\bar{a}_{xy}$ around a z-axis, that is substantially orthogonal to the two-dimensional vector of acceleration $\bar{a}_{xy}$. The second angle φ is the rotation angle of the two dimensional vector of acceleration $\bar{a}_{xz}$ around a y-axis, that is substantially orthogonal to the two-dimensional vector of acceleration $\bar{a}_{xz}$. The second angle of the rotation φ is the angle of rotation in the plane of the swing.

The three-dimensional accelerometers 6a', 6b' can function in two different, partially overlapping measurement ranges. The measurement of the three-dimensional accelerometer 6a' ranges between about 5 g to about 250 g and is thus particularly suited to relatively faster swings. The other three-dimensional acceleration sensor 6b' ranges between about 0 g to about 16 g and is thus particularly suited for relatively slow swings.

The angle sensor 10', provide means for detecting an angular velocity. The angle sensor 10', can be a gyroscopic sensor. The angle sensor 10', functions within a range from about 50 to about 2000 degrees/second (deg/s).

The three-dimensional accelerometers 6a', 6b' and the angle sensor 10', can be micro electro-mechanical systems, commonly known as MEMS. The measuring device 2' also includes a timing means 14. The timing means 14 measures the timing parallel to the three-dimensional accelerometers 6a', 6b' and the angle sensor 10', allowing each measured value of the three-dimensional accelerometers 6a', 6b' and of the angle sensor 10', to have a corresponding time value assigned.

The measuring device 2' also includes a computation means 16. The computation means 16 receives and preprocess the raw data that are provided by the three-dimensional accelerometers 6a', 6b', the angle sensor 10', and the timing means 14. The computation means 16 calculates a time dependent position of the club in space, as well as the club orientation and speed in the course of the swing based on the captured raw data and on the basis of physical models.

The computation means 16 includes a memory system 16a, a processor 16b and a bus 16c coupling the memory system to the processor. The memory system 16a stores programs that serve the evaluation of raw data received from the three-dimensional accelerometers 6a', 6b', the angle sensors 10, and the timing means 14.

Figure 1C:
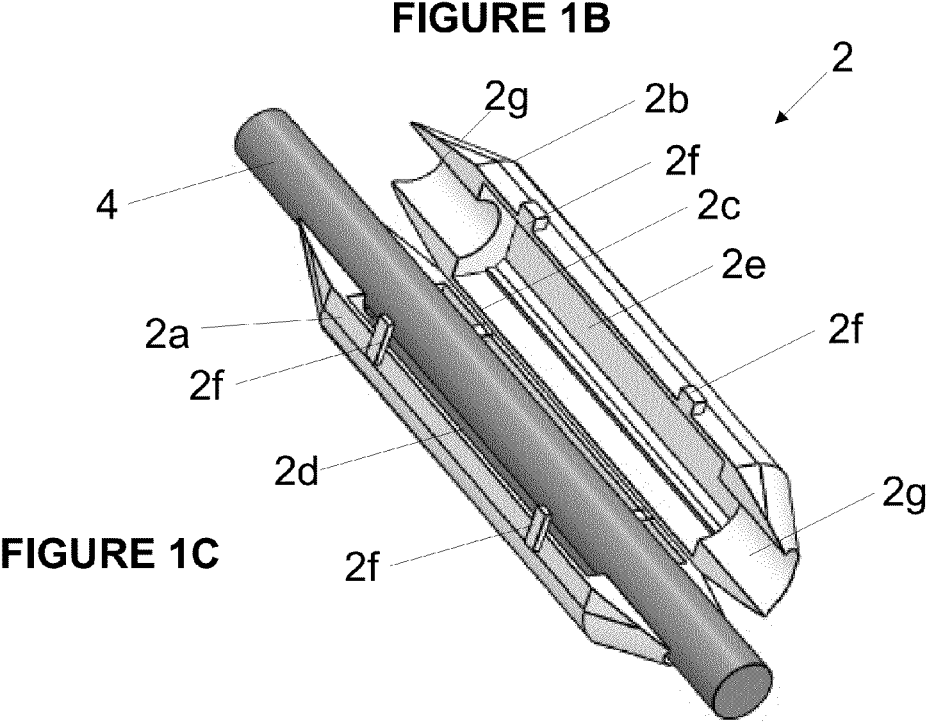
FIG. 1C shows a perspective view of the measuring device, in accordance with embodiments of the invention.
Figure 1D:
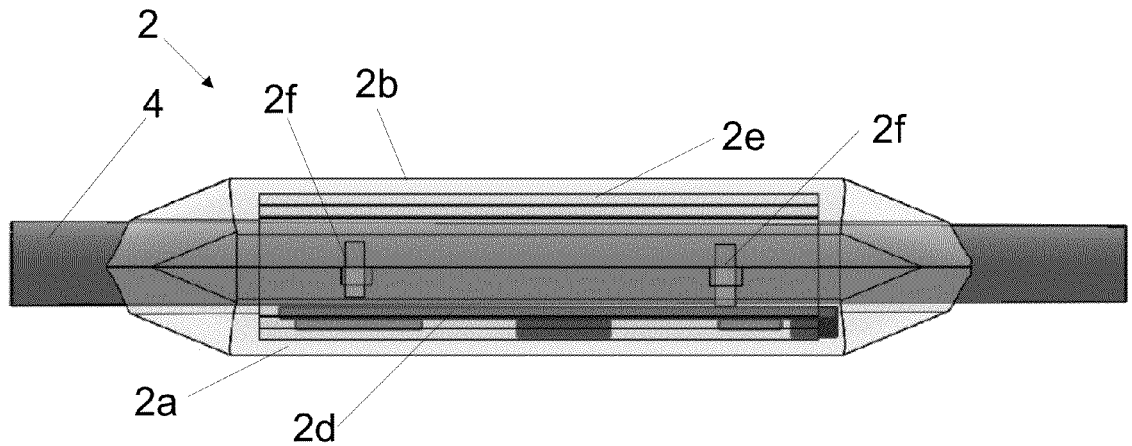
FIG. 1D shows a side view of the measuring device, in accordance with embodiments of the invention.
Figure 1E:
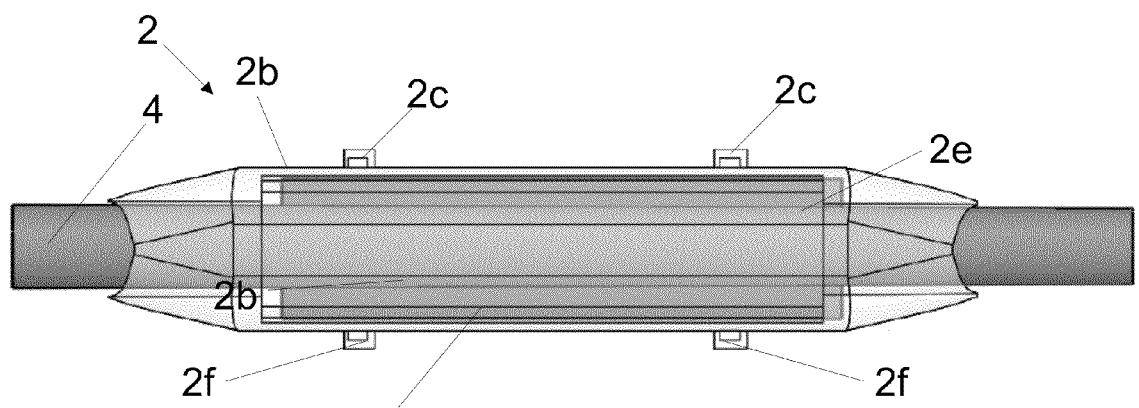
FIG. 1E shows a top view of the measuring device, in accordance with embodiments of the invention.
Figure 1F:
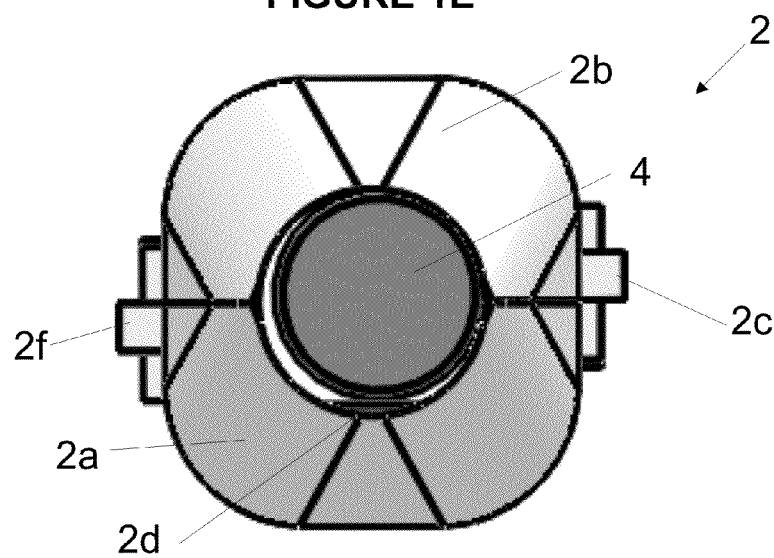
FIG. 1F shows an end view of the measuring device, in accordance with embodiments of the invention.

FIG. 1C shows a perspective view of the measuring device 2, in accordance with embodiments of the invention. FIG. 1D shows a side view of the measuring device 2, in accordance with embodiments of the invention. FIG. 1E shows a top view of the measuring device 2, in accordance with embodiments of the invention. FIG. 1F shows an end view of the measuring device 2, in accordance with embodiments of the invention. The measuring device 2 can be in the form of a "clamshell" such that it will have two sides 2a, 2b with a hinge 2c coupling the two sides. When the two sides 2a, 2b are opened, one side 2a can house the electronic components 2d while the other side 2b can hold the battery 2e. A latching or locking mechanism 2f will hold the two sides together clamping the club 4 as the club passes between the two sides 2a, 2b. The two sides 2a, 2b can include clamps 2g that can secure the measuring device 2 to the club 4 so that the measuring device does not slide along the length of the club.

Figure 2:
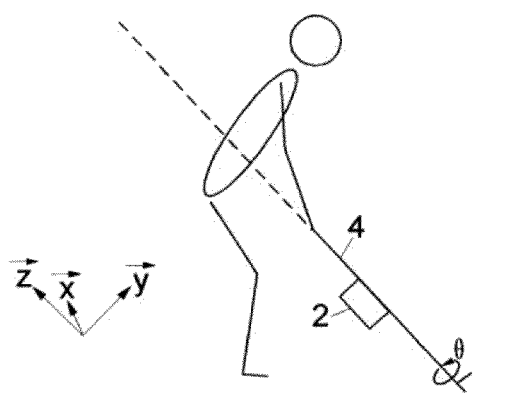
FIGS. 2 and 3 are different views of a schematic representation of a training device including the measuring device, in accordance with embodiments of the present invention.
Figure 3:
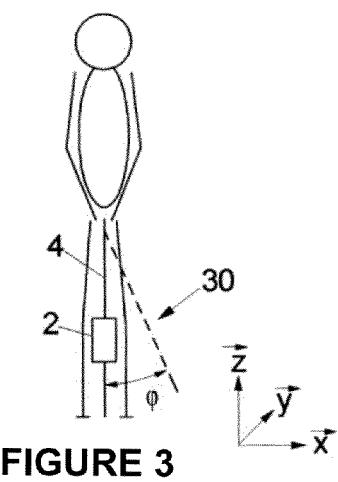

FIGS. 2 and 3 are different views of a schematic representation of a training device 30 including the measuring device 2, in accordance with embodiments of the present invention. The training device 30 is suitable to train a swing movement of a club 4. To provide prospective, the FIGS. 2 and 3 show the training device 30 together with a user. In FIG. 2, the swing path is substantially perpendicular to the plane of the drawing and in FIG. 3 the swing path is substantially parallel to the plane of the drawing.

The training device 30 includes the measuring device 2 and a club 4 used to train a swing movement. The club 4 extends along a shaft axis A. The measuring device 2 is mounted to the club 4 such as by fasteners 24. The club 4 can be a golf club or any other suitable club as may be used for other ball sports, as described above. Alternatively, the club may represent any tool having a desired swing path such as a broom, mop, paint brush or other tool having repetitive swing type motions.

Figure 4:
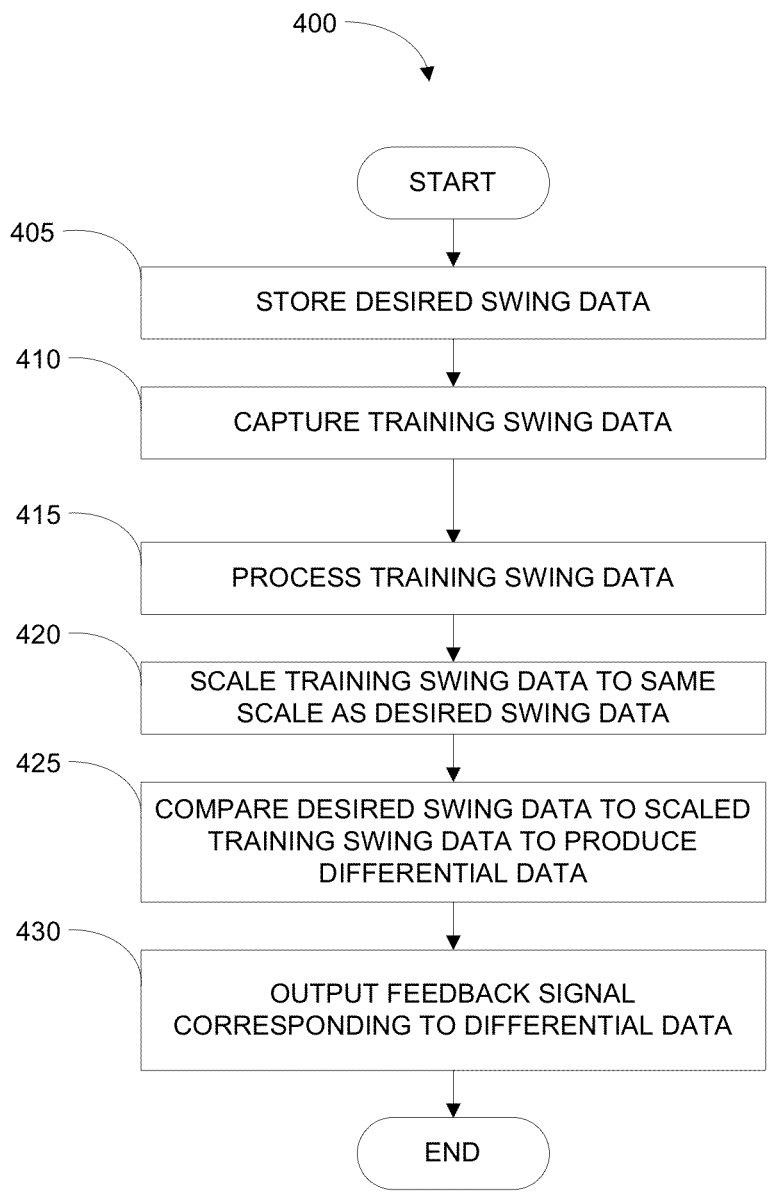
FIG. 4 is a flowchart diagram that illustrates the method operations performed in using the measuring device to train a user to use a desired swing, in accordance with one embodiment of the present invention.

FIG. 4 is a flowchart diagram 400 that illustrates the method operations performed in using the measuring device 2 to train a user to use a desired swing, in accordance with one embodiment of the present invention. In an operation 405, at least one set of reference data corresponding to at least one desired swing is stored in a reference database or table in the memory system 16a of the computational means 16. It should be understood that many sets of reference data can be stored in the memory system and each one of the sets of reference data corresponding to one of many desired swings.

The measuring device 2 mounted on the club 4 such that the two-dimensional acceleration vector $\bar{a}_{xy}$, which is captured by the two-dimensional accelerometers 6a, 6b, is orthogonal to the a-axis of the club 4. From the above arrangement of the two-dimensional accelerometers of 6a, 6b, the one-dimensional accelerometers 8a, 8b, the first angle sensor 10 and the second angle sensor 12 relative to each other and the relative position of the club 4 and the two-dimensional accelerometers 6a, 6b the following relationships are found: the one-dimensional acceleration vector $\bar{a}_2$, which is captured by the one-dimensional accelerometers 8a, 8b, runs parallel to the club shaft a-axis. The first angle of rotation θ, which is measured by the first angle sensor 10, corresponds to the angle of rotation of the club 4 to around the shaft axis A. The second angle of rotation φ, which is measured by the second angle sensor 12, corresponds to the angle of rotation of the club 4 to a y-axis, which stretches primarily perpendicular to the club shaft a-axis movement.

To be able to use the training device 30 to train a swing movement on a desired swing path, the measuring device 2 is mounted on the club shaft A, that at intended use of the training device 30 the Y-axis around which the second rotation angle φ rotates, stretches largely orthogonal to the desired swing path.

The procedure for the training of a swing movement with the club 4 on a desired swing path is based the raw data captured by accelerometers 6a, 6b, 8a, 8b, the angle sensors 10, 12, and the timing means 14 corresponding to a training swing, in an operation 410.

The captured training swing raw data is transmitted to and processed by the computation means 16, in an operation 415. The computation means 16 converts the training swing raw data into training swing processed data such as, for example, the orientation, maximum acceleration, duration of individual phases of the training swing and the impact movement, force distribution and accelerations during the individual phases and swing path.

This processing can optionally include scaling the training swing data in an optional operation 420. Operations 410-420 can occur in real time or near real time, so that the training swing processed data is immediately available to the user.

A user training a desired swing may not be able to read error information from only the processed data of the swing movement. Thus the training swing processed data is compared with a desired set of reference data corresponding to the desired swing and determines the difference between the processed data and reference data (i.e., differential data), in an operation 425.

Multiple sets of reference data, representing multiple different, desired swings can be included in the measuring device 2. The user may select the corresponding desired swing and though the control panel 20.

In an operation 430, a feedback signal is output by the signaling device 26 when a difference between the measured training swing movement and the selected set reference data (i.e., the selected desired swing) is detected. The magnitude (e.g., loudness, brightness, color, amplitude of the vibrations, etc.) of the signal can correspond with a size of the difference. By way of example, an acoustic signal can have an increasing volume corresponding to an increasing difference between the measured swing movement and the selected desired swing.

More experienced players such as a professional player, that are not necessarily dependent on a comparison of the measured data with reference data, can also directly access the captured, processed data. A comparison with reference data may or may not take place in this instance.

The training swing data, as well as the difference to the desired set of reference data are obtained in real time, i.e. during the training swing. Thus, the user can receive instantaneous feedback regarding which phases of the swing movement are different than the desired set of reference data (i.e., differential data).

In addition, a user can transfer all data (raw data, processed data, differential data) via the interface 18 to an external data processing system. This allows further analysis of swings after the swings were completed. By way of example, the swing can be compared to multiple previous swings to track swing improvement (i.e., smaller differential data) over multiple repetitions and multiple training sessions.

Figure 5:
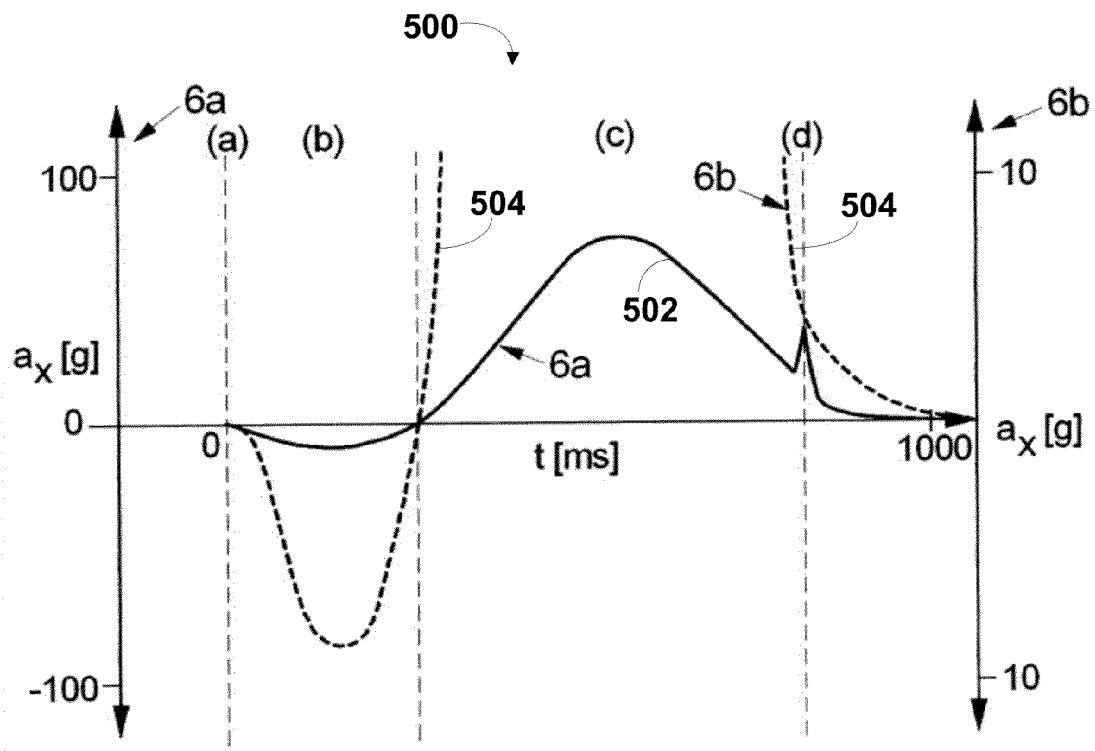
FIG. 5 is a graph of measured values in an x-direction of multiple two-dimensional accelerometers as a function of time, in accordance with embodiments of the present invention.
Figure 6:
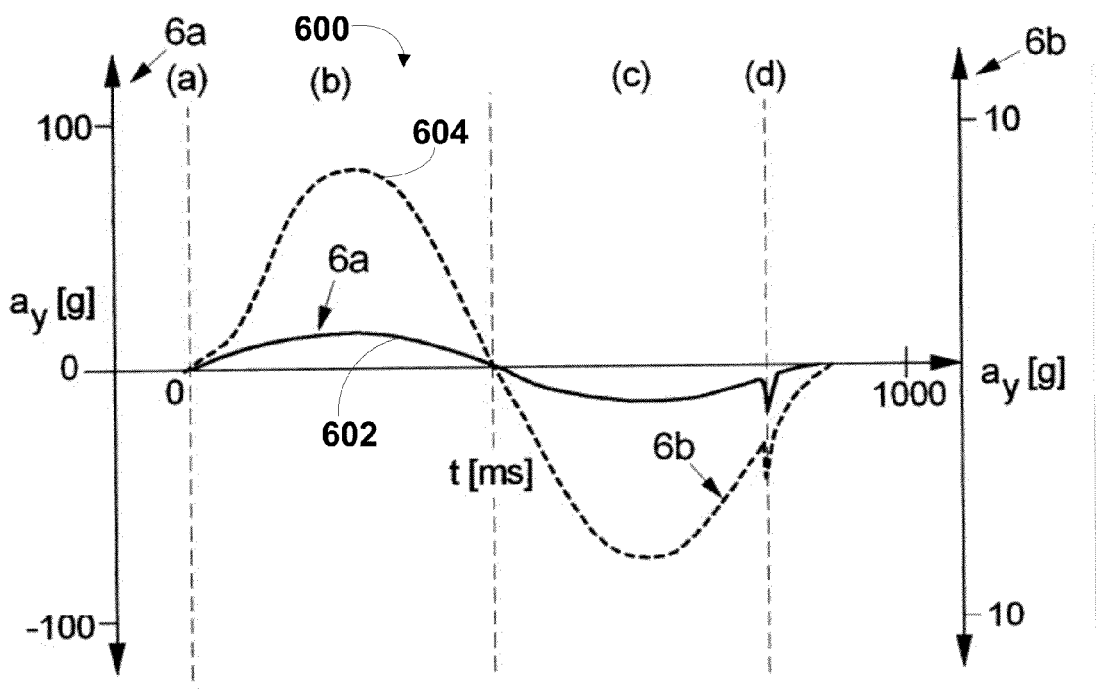
FIG. 6 is a graph of measured values in y-direction of multiple two-dimensional accelerometers as a function of time, in accordance with embodiments of the present invention.
Figure 7:
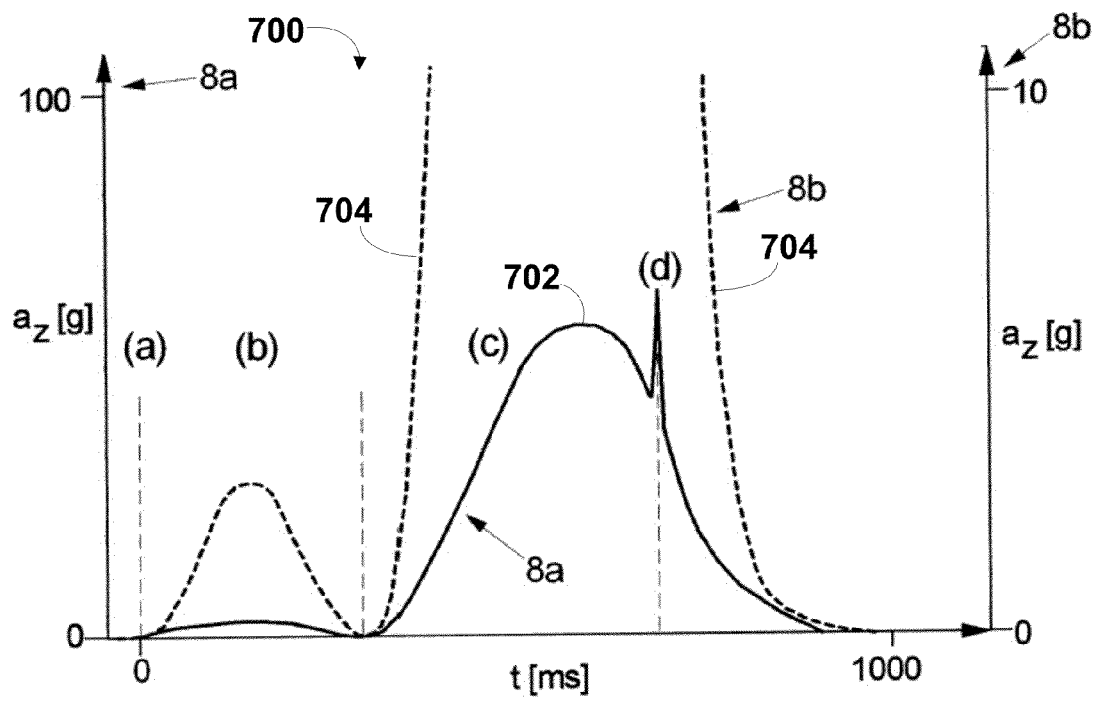
FIG. 7 is a graph of measured values in z-direction of one or more one-dimensional accelerometers as a function of time, in accordance with embodiments of the present invention.
Figure 8:
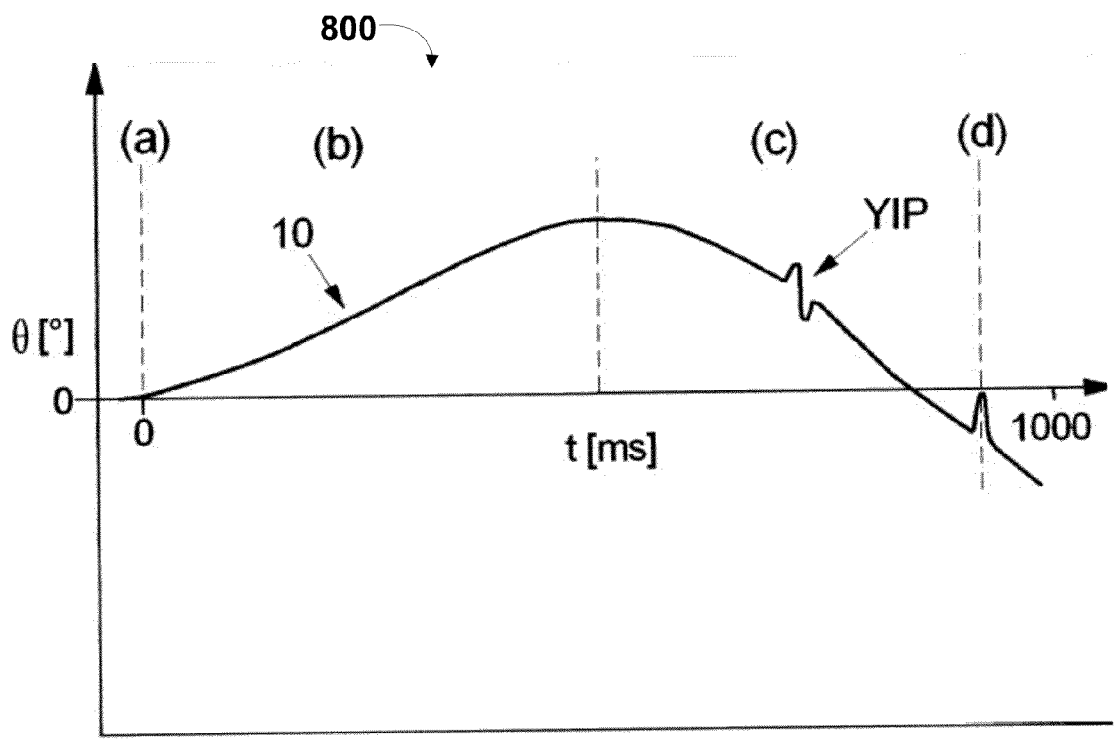
FIG. 8 is a graph of a signal of a first angle sensor as a function of time, in accordance with embodiments of the present invention.
Figure 9:
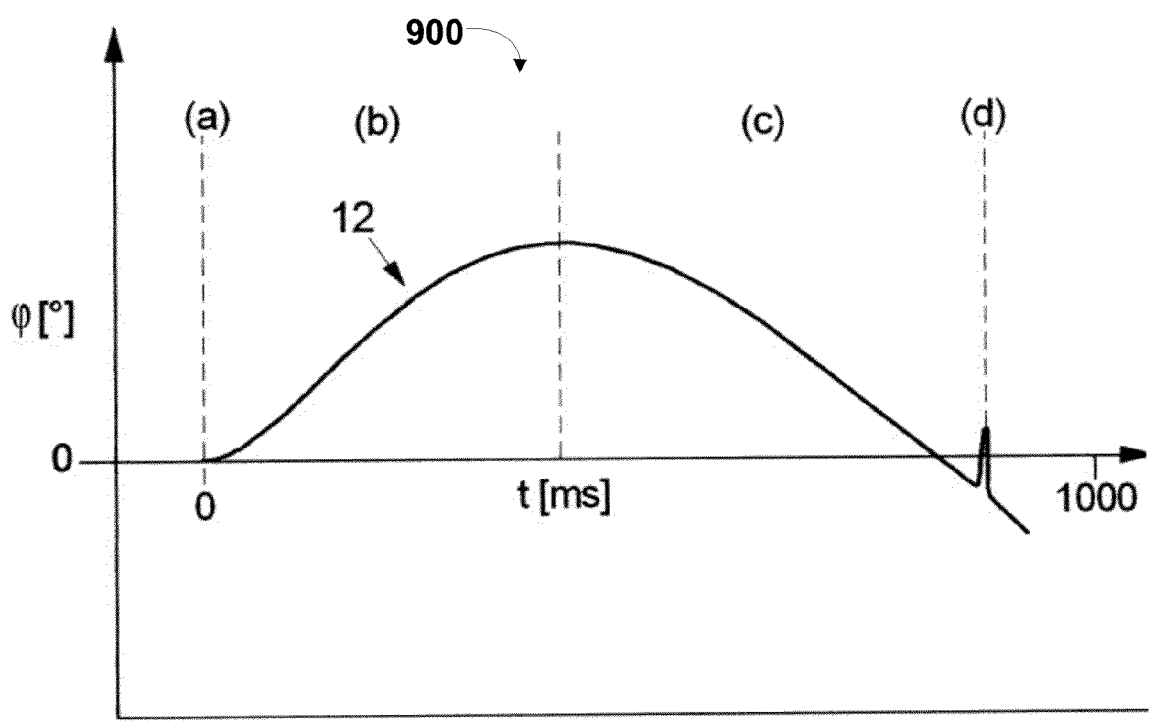
FIG. 9 is a graph of a signal of a second angle sensor as a function of time, in accordance with embodiments of the present invention. The signals shown in the FIGS. 4 to 9 were measured simultaneously using the respective sensors.

The FIGS. 5 to 9 schematically represent the measuring signals of the individual sensors of 6a, 6b, 8a, 8b, 10, 12 in function of time for a swing with a golf club 4. FIG. 5 is a graph 500 of measured values in an x-direction of multiple two-dimensional accelerometers as a function of time, in accordance with embodiments of the present invention. FIG. 6 is a graph 600 of measured values in y-direction of multiple two-dimensional accelerometers as a function of time, in accordance with embodiments of the present invention. FIG. 7 is a graph 700 of measured values in z-direction of one or more one-dimensional accelerometers as a function of time, in accordance with embodiments of the present invention. FIG. 8 is a graph 800 of a signal of a first angle sensor 10 as a function of time, in accordance with embodiments of the present invention. FIG. 9 is a graph 900 of a signal of a second angle sensor 12 as a function of time, in accordance with embodiments of the present invention. The signals shown in the FIGS. 5 to 9 were measured simultaneously using the respective sensors.

The relevant phases of the swing are the swing beginning (a), a back swing (b) and a forward swing (c) and are marked in each measuring signal. The backswing (b) is the phase between the start of the swing (a) and the moment of the highest club position.

The forward swing (c) is the phase between the moment of the highest position of the club and the ball hit (d) accordingly. The duration of a swing depends on the user is typically between about 600 ms and about 1000 ms. The FIGS. 5 to 9 represent a strike that has a length of about 1000 ms. The relative duration of back swing and forward swing is not accurate, but only schematic, depicted in the FIGS. 5 to 9. Typically, the duration of the back swing is a multiple of about two times as large as the duration of the forward swing.

FIG. 5 shows how the size of the acceleration vector $\bar{a}_x$ as a component of the two-dimensional vector of acceleration $\bar{a}_{xy}$ changes in the course of the swing. As shown in FIG. 3, the acceleration vector $\bar{a}_x$ is oriented substantially perpendicular to the club shaft A and essentially parallel to the excellent swing path. Two graphs 502, 504 are shown in FIG. 5. Graph 502 shown as solid line corresponds to a measurement of a two-dimensional accelerometer 6a, which measures in a range of 10 to 100 g. The value of the acceleration measured by the accelerometer 6a $\bar{a}_x$ is shown in FIG. 5 on the left y-axis.

Graph 504 shown as dashed line is a parallel measurement of the second two dimensional accelerometer 6b, which measures in a range from about 0 g to about 10 g. The value by the accelerometer 6b measured acceleration $\bar{a}_x$ is shown in FIG. 5 on the right y-axis. While the back swing (b) is measured with a good resolution by the accelerometer 6b, the signal is saturated for accelerometer 6b for the forward swing of (c). Conversely, the back swing (b) is not adequately resolved by accelerometer 6a, forward swing (c) however quite well. Thus, the accelerometer 6b is used for the evaluation of the back swing (b) and the accelerometer 6a is used for the evaluation of the forward swing (c). The acceleration vector $\bar{a}_x$ of the back swing (b) is negative and has a parabolic course.

The acceleration vector $\bar{a}_x$ of the forward swing (c) is positive, and has also a parabolic course having a peak at the moment of impact (d).

FIG. 6 shows two graphs 602, 604 of the magnitude of the acceleration vector $\bar{a}_y$ as the other component of the two-dimensional vector of acceleration $\bar{a}_{xy}$ changes during the course of the swing. As FIG. 3 shows, the acceleration vector $\bar{a}_y$ is oriented substantially perpendicular to the club shaft A and runs essentially perpendicular to a desired swing path.

In a swing matching the desired swing, there would be no acceleration in the y-axis, and the acceleration vector $\bar{a}_y$ would be equal to zero during the whole stroke. The graphs 602, 604 of the acceleration vector $\bar{a}_y$ shown in FIG. 6 is determined solely from the rotation of the club around the club shaft A. The amplitudes of the back swing (b) and of the forward swing (c) are essentially equal in size and differ only in the sign. The graph 604 corresponding to accelerometer 6b is preferably used evaluate the entire swing because the amplitudes are generally relatively small and thus can typically be more accurately measured by accelerometer 6b.

An aim of the training is to the move the club as close as possible to a desired plane, that is, to minimize the displacement of the club from the desired plane. This objective can be trained by checking the trajectory of the acceleration vector $\bar{a}_y$ with the help of accelerometers of 6a, 6b.

FIG. 7 shows the magnitude of the acceleration vector $\bar{a}_y$, which extends parallel to the club shaft A, changes during the swing. FIG. 7 shows two graphs 702, 704. The graph 702 shown as solid line represents the data measured by the one-dimensional accelerometer 8a. The graph 704 shown as a dashed line represents the data measured by the second one-dimensional accelerometer 8b. The corresponding ordinate axes are marked accordingly. The slope of the acceleration vector $\bar{a}_z$ of the forward swing follows the slope of the acceleration vector $\bar{a}_x$ of the forward swing. The slope of the acceleration vector $\bar{a}_z$ of the backward swing substantially follows the acceleration vector $\bar{a}_x$ of the backward swing, only the sign is now positive. The evaluation of the measured acceleration vector $\bar{a}_z$ is analogous to the procedure of evaluation for the acceleration vector $\bar{a}_x$.

On the basis of the measured vectors $\bar{a}_x$, $\bar{a}_y$, and $\bar{a}_z$ the accelerometers 6a, 6b, 8a, 8b the address position, i.e. the position of club 4 immediately prior to the golf swing can be determined.

FIG. 8 shows a graph 800 of the variation of the first angle θ of the club 4 during the swing in relation to the club shaft A. The history of the value of the first rotation angle θ during the swing corresponds to a parabola. Often the first angle θ at swing beginning (a) not identical to the first angle θ at the ball hit (d).

Restated, the clubhead can change its orientation during swing due to a rotation of the entire club 4 to the club shaft A. The so-called open-close value of the club 4 results from the difference between of the two brackets. The difference is a measure of whether the ball will deviate from the desired flight path more to the left or more to the right. Ideally, the clubhead is moved during the swing vertically to the desired swing path. A training aim is to minimize the difference between these θ at swing beginning (a) and θ at ball hit (d). This objective can be trained by checking the history of the first angle θ by the first angle sensor 10.

A common problem is the so-called YIP. The YIP is a release of the wrist causing an uncontrolled rotation of the club 4 relative to the club shaft A. The YIP is measured by the first angle sensor 10. The movement takes place on a time scale of about 50 ms. For capturing this, a sampling resolution of between about 50 Hz and about 5000 Hz is needed and more preferably a in particular sampling resolution of between about 500 Hz to about 2000 Hz. The YIP is expressed in the time-course of the first angle θ as a hooked deviation as shown in FIG. 8. Another training goal is to reduce magnitude of the YIP. The magnitude of the YIP can be reduced by checking the history of the first angle θ as captured by the first angle sensor 10.

FIG. 9 shows a graph 900 of the variation of the second angle φ of the club 4 during the swing in relation to the y-axis. The second angle of the rotation φ corresponds to the angle of the club 4 during the swing within the swing plane. The time course of the second angle φ corresponds to that of the first angle θ. The second angle φ can often show values that differ at the beginning of the swing (a) and at the ball hit (d). A so-called launch angle can be derived from the difference between angle φ at beginning of the swing (a) as compared to angle φ at ball hit (d). The launch angle is the angle that includes the front area of the clubhead includes with a vertical line at the ball hit (d). A training objective is to minimize the difference of the launch angles φ between at the beginning of the swing (a) and at the ball hit (d) for certain swings. Other swings may require, as closely as possible, to reproduce a desired launch angle. These goals can be trained by checking the history of the second angle φ as captured by the second angle sensor 12.

Alternatively, a determination is also possible using the two-dimensional accelerometers 6a, 6b, and the result depends in particular on the component in the x direction as shown in FIG. 3. However, the accuracy that can be achieved by the second angle sensor 12 is much higher than that of the accelerometers of 6a, 6b, so the preferable measurement is that captured by the second angle sensor 12.

The two-dimensional accelerometers 6a, 6b, together with the one-dimensional accelerometers 8a, 8b and the first angle of rotation sensor 10 provide the relevant data to determine the speed and acceleration of the golf club 4 along the swing path during the swing.

Another important information is the time course of the acceleration vector $\bar{a}_z$ along the axis of the club. If more than one measuring range is synchronously recorded the slow acceleration of a putting motion as well as the high acceleration of a swing can be captured without overflow. From the time dependency of the acceleration vector $\bar{a}_z$ a maximum speed of the clubhead can be determined as well as the position of the club head at the time of the highest speed relative to the time the ball hit (d). A typical aim of the training is to achieve that the time of the highest speed and the time of the ball hit (d) coincide. A further aim of the training is, to optimize the maximum speed, that is, for example, to maximize or to train to achieve a consistent target speed value.

Figure 10:
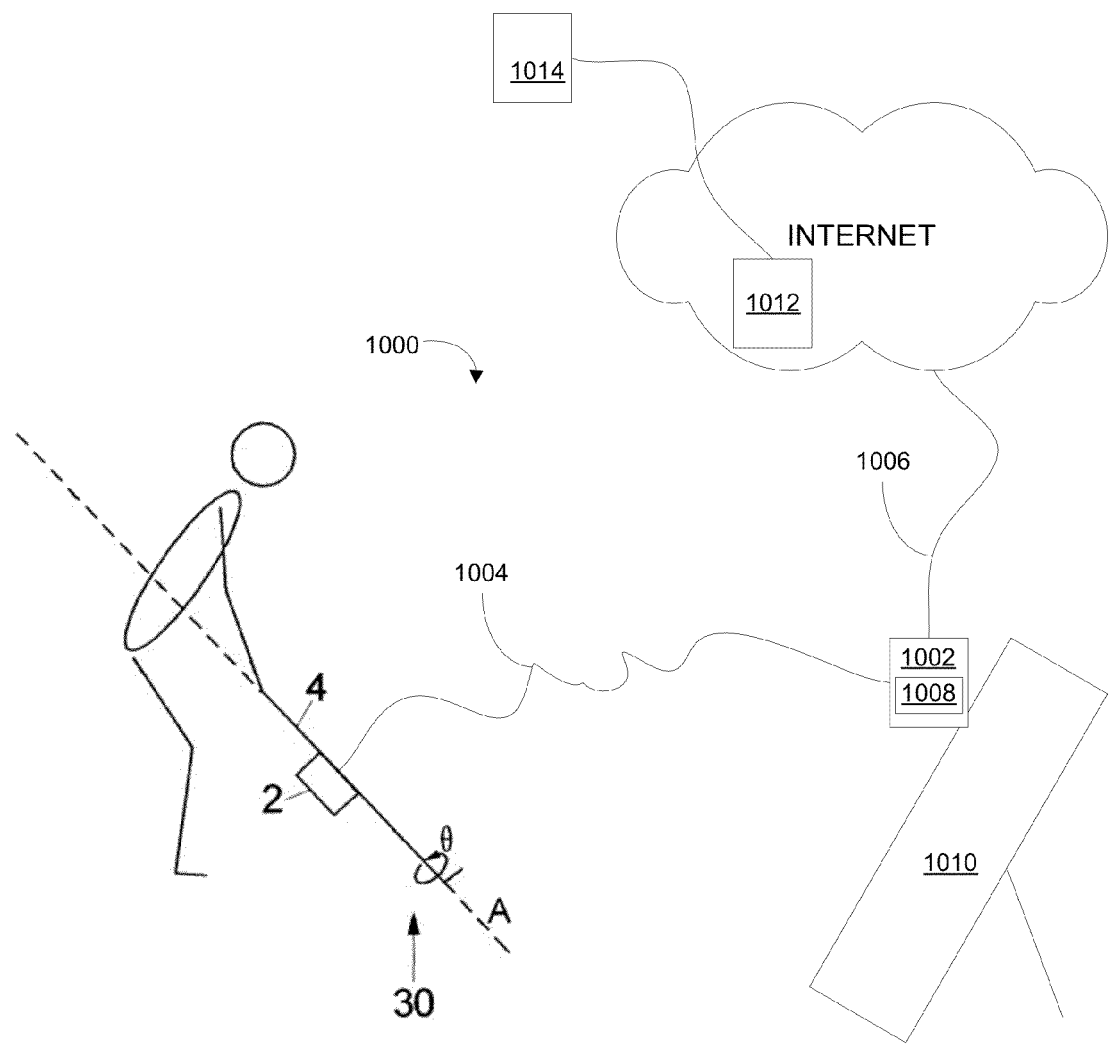
FIG. 10 shows a schematic of an external device 1002 for capturing training swing data, in accordance with embodiments of the present invention.

The interface 18 also allows the measuring device 2 to collect additional data relating to the training swing from external devices. FIG. 10 shows a schematic of an external device 1002 for capturing training swing data, in accordance with embodiments of the present invention. The external device 1002 is linked to the measuring device by a wireless data link 1004. By way of example, the external device 1002 can include a video camera that can capture video of the training swing. The training swing video can be uploaded to the measuring device via the data link 1004. The measuring device 2 can process the training swing video to compare to a corresponding video of the desired swing.

In addition to the differential data described above, the measuring device 2 can also present a differential video presentation. The differential video presentation can be in numerous forms. By way of example, the differential video presentation can be a virtual video presentation of the training swing using the training swing data captured by the measuring device 2 which can then be compared to the corresponding desired swing video or desired swing virtual presentation can be compiled from the corresponding set of reference data. In another example, the video presentation can be an actual live video recording of at least one of or both of the desired swing and/or the training swing.

An optional video display screen such as a touch sensitive screen can be included in the control panel 20. The optional video display screen can present the video presentation to the user.

Optionally, the video display screen can be external from the training device 2. By way of example, the video display screen can be linked to the training device 2 via the wireless data connection 1004. In one example, the external device 1002 video camera can be set up to capture the training swing video data can include a display screen 1008.

The external device 1002 including the video camera and the display screen 1008 can be included in a so called smart phone type of cell phone, a computer, a laptop computer, a tablet computer, a or other suitable devices such as dedicated cameras, hand-held media players such as an IPod available from Apple, Inc.

The smart phone includes an operating system, a processor, a data link such as Bluetooth or similar wireless link and a cellular telephone transceiver. The smart phone can also include a data connection 1006 via the cellular network capable of uploading at least one of the training swing video and/or the captured training swing data to a remote internet server 1012 for storage and further processing. The further processing can include more intensive analysis of the uploaded data and even remote coaching from a coach 1014 that may be available to review the uploaded training swing data in near real time.

The measuring device 2 can also include a virtual caddy application 16e for use during play a game. By way of example, when playing a particular hole at a particular golf course, the virtual caddy application 16e can compare a user's swing to a recommended swing for the particular hole.

The virtual caddy application 16e can access a database of information regarding the particular golf course. The golf course database can be included in the virtual caddy application 16e. Alternatively, the virtual caddy application 16e can access the golf course database via the internet such as via a wireless data link 1004 to an external device 1002 having access to the internet.

Accessing the golf course database via the internet can also include accessing weather information such as wind, rain and other weather phenomenon that may affect the swing for the particular hole. The measuring device 2 can also include a 3-axis digital compass to detect the direction of the club 4, so that the golf course database can provide more information regarding how the wind will affect the swing for the particular hole.

The measuring device 2 can also include a global positioning system (GPS) sensor that provides positional data. Alternatively, the external device 1002 can include a GPS sensor or otherwise provide location data (e.g., triangulation and any other source of location data including manual entry of location data). The virtual caddy application 16e can use the GPS sensor and the golf course data to provide feedback on swing direction, speed, club selection. By way of example, when the user is setting up a golf shot from a rough area off a fairway, the virtual caddy application 16e can use the GPS positional data and detailed golf course data to determine direction of the swing, speed of the swing and club selection. Other aspects of the swing can also be recommended such as how open or closed face of the golf club or any other minute aspect of the swing that could be predicted.

The measuring device 2 can also record the user's personal capabilities and the virtual caddy application 16e can adjust the swing recommendations based on the recorded user capabilities.

The user can make several practice swings for the measuring device 2 to evaluate and provide feedback for. Thus, perfecting the user's swing for this particular golf shot.

With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic on a computer readable medium. The computer readable medium is any data storage device that can store data that can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above Figures are not required to be performed in the order illustrated, and that all the processing represented by the operations may not be necessary to practice the invention. Further, the processes described in any of the above Figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. The measuring device to capture a swing movement of a club, comprising:
 a first three dimensional accelerometer to capture a first two-dimensional vector of acceleration within a first range of acceleration;

a second three dimensional accelerometer to capture a second two-dimensional vector of acceleration within a second range of acceleration different from the first range of acceleration;

a first angle sensor to capture a first rotation angle, a second rotation angle and a third rotation angle, the first rotation angle corresponding to the first two-dimensional vector of acceleration around a z-axis, where the z-axis is substantially normal to the two-dimensional vector of acceleration, the second angle of rotation corresponding to a one-dimensional acceleration vector to a y-axis, the y-axis is essentially perpendicular to the one-dimensional acceleration vector and a computation means including logic on a computer readable medium for converting a set of raw data captured from the first three dimensional accelerometer, the second three dimensional accelerometer and the first angle sensor into formatted data that includes an orientation, a maximum acceleration, a duration of individual phases of the swing movement, a force distribution and a plurality of accelerations during the corresponding plurality of individual phases of the swing movement and a swing path, wherein the computation means includes an interface, to transmit the processed or raw data to an external data processing systems.

2. The measuring device according to claim 1, the first angle sensor capable of detecting an angular velocity of the club.

3. The measuring device according to claim 1, wherein the first angle sensor is sensitive in a range from 50 to 2000 degree/second.

4. The measuring device according to claim 1, wherein the first range of acceleration is between about 0 g-force to about 15 g-force.

5. The measuring device according to claim 1, wherein the range of acceleration of between about 5 g-force to about 250 g-force.

6. The measuring device of claim 1, wherein at least one of the first three dimensional accelerometer, the second three dimensional accelerometer and the first angle sensor are micro electro-mechanical systems.

7. The measuring device of claim 1, further comprising a time measuring means capable of measuring a time during the swing movement.

8. The measuring device of claim 1, further comprising a wireless data link from the interface to the external data processing system.

9. The measuring device of claim 1, wherein the external data processing system includes a video camera capable of capturing video of the swing movement.

10. The measuring device of claim 1, wherein the external data processing system includes a data link to a remote internet server.

11. The measuring device of 10, wherein the remote internet server is capable of providing additional processing of the captured data.

12. The measuring device of claim 1, further comprising a control panel with which a user can select which processed data are produced by the computation means.

13. The measuring device of claim 1, further comprising a signaling device capable of outputting a signal to a user based on the raw and/or processed data or the data.

14. A system comprising a measuring device to capture a swing movement of a club, the system comprising:
    a first three dimensional accelerometer configured to capture a first two-dimensional vector of acceleration within a first range of acceleration;
    a second three dimensional accelerometer configured to capture a second two-dimensional vector of acceleration within a second range of acceleration different from the first range of acceleration, wherein the first three dimensional accelerometer is different from the second three dimensional accelerometer;
    a first angle sensor configured to capture a first rotation angle, a second rotation angle and a third rotation angle, the first rotation angle corresponding to the first two-dimensional vector of acceleration around a z-axis, where the z-axis is substantially normal to the two-dimensional vector of acceleration, the second angle of rotation corresponding to a one-dimensional acceleration vector to a y-axis, the y-axis is essentially perpendicular to the one-dimensional acceleration vector; and
    a computation device including logic on a non-transitory computer readable medium for converting a set of raw data captured from the first three dimensional accelerometer, the second three dimensional accelerometer and the first angle sensor into formatted data that includes an orientation, a maximum acceleration, a duration of individual phases of the swing movement, a force distribution and a plurality of accelerations during the corresponding plurality of individual phases of the swing movement and a swing path, wherein the computation device includes an interface configured to transmit a processed version of the set of raw data to an external data processing system.

\* \* \* \* \*